United States Patent [19]
Holt

[11] Patent Number: 4,608,627
[45] Date of Patent: Aug. 26, 1986

[54] NON-DISSIPATIVE CURRENT DISTRIBUTION CIRCUIT FOR MAGNETOHYDRODYNAMIC GENERATOR ELECTRODES

[75] Inventor: James F. Holt, Medway, Ohio

[73] Assignee: The United States of America as represented by the Secretary of the Air Force, Washington, D.C.

[21] Appl. No.: 746,902

[22] Filed: Jun. 20, 1985

[51] Int. Cl.[4] .................... H02M 3/315; H02M 3/337
[52] U.S. Cl. ....................................... 363/131; 310/11; 322/7; 363/17; 363/24; 363/71; 363/134; 363/136; 363/139
[58] Field of Search ................. 322/24, 90, 7; 307/53, 307/32; 310/11; 363/20, 24, 71, 27, 131, 134, 136, 139

[56] References Cited

U.S. PATENT DOCUMENTS

| | | | |
|---|---|---|---|
| 3,368,089 | 2/1968 | Klein | 310/11 |
| 3,792,340 | 2/1974 | Sheinkman | 310/11 |
| 4,047,094 | 9/1977 | Rosa | 310/11 |

FOREIGN PATENT DOCUMENTS

| | | | |
|---|---|---|---|
| 565364 | 10/1977 | U.S.S.R. | 363/27 |
| 881949 | 11/1981 | U.S.S.R. | 363/27 |

*Primary Examiner*—William H. Beha, Jr.
*Attorney, Agent, or Firm*—Donald J. Singer; Bobby D. Scearce

[57] ABSTRACT

A nondissipative current distribution circuit for a power source, such as magnetohydrodynamic generator, that delivers its output current through a first plurality of positive electrodes and a second plurality of negative electrodes (including plural positive and negative electrode pairs) and provides a predetermined current distribution among the electrodes, is described, and comprises a transformer including first and second windings, the second winding including means for connection to a load, the first winding having plural adjustable taps intermediate its ends, an inductor connected at one end to one end of the first transformer winding and at the other end to a plurality of capacitors connected respectively to each electrode, and a first plurality of silicon controlled rectifiers connected, respectively, between each positive electrode and a tap or the second end of the first transformer winding, and a second plurality of silicon controlled rectifiers connected, respectively, between each negative electrode and a tap or the second end of the first transformer winding, the first plurality of rectifiers configured to conduct alternately with the second plurality of rectifiers. In alternative embodiments, mechanical switches are connected between each electrode and tap or winding end, all switches configured to operate in unison, with an RC filter connected across each switch; or a silicon controlled rectifier switch is connected between each electrode and tap or winding end, all switches configured to operate in unison, with a commutating circuit connected across each rectifier switch.

44 Claims, 20 Drawing Figures

NON-DISSIPATIVE CURRENT DISTRIBUTION CIRCUIT FOR MAGNETOHYDRODYNAMIC GENERATOR ELECTRODES

RIGHTS OF THE GOVERNMENT

The invention described herein may be manufactured and used by or for the Government of the United States for all governmental purposes without the payment of any royalty.

BACKGROUND OF THE INVENTION

The present invention relates to circuitry for applying the output of a DC electrical power source, having its output presented by more than two electrodes, into a two-terminal load resistance with a minimum of power lost in the circuit components. The circuitry of the present invention may find particular utility for connecting a multi-terminal magnetohydrodynamic (MHD) generator or other power source that provides dc or pulsating dc current of pulse duration from a few tenths of a second to continuous dc.

In MHD generators of the multi-electrode type in which the load current is extracted from the generator through more than one pair of electrodes, a common problem is encountered in dividing the current more or less equally among the electrodes at the positive side of the generator, and likewise in dividing the load current equally among the electrodes at the negative side of the generator. This is done to prevent overheating of any one electrode, since the current will not normally divide evenly unless constrained to do so. With existing MHD power systems, a resistor is used at each electrode of suitable resistance to force the equal distribution of current; the result is a complex load circuit which generally dissipates about 15 to 20 percent of the MHD output power in the current dividing resistors. All the power of the MHD generator is therefore not available for use into a single two terminal load.

The present invention comprises a tapped output transformer in conjunction with novel converter circuitry which permits substantially all the output power of a DC power source having multiple output electrode pairs, to be delivered to a two-terminal load, while dividing the output current among the electrodes of the generator according to a predetermined current distribution scheme. The invention saves the power normally lost in ballast resistors connected to MHD generators that have a two-terminal load and more than one pair of output electrodes. Since the segmented electrode MHD generator in many applications has the greatest efficiency among the various open cycle combustion MHD generator styles, efficiently directing the current from such a generator into a two-terminal load is an important problem in the art which is solved by the present invention.

It is, therefore, a principal object of the present invention to provide an improved current distribution circuit for MHD generator electrodes.

It is a further object of the invention to provide a load circuit for a DC power source that delivers its output current through more than one pair of output electrodes, each electrode to carry a specified fraction of the total load current.

It is a further object of the invention to provide a circuit for controlling the current at the output of MHD generators, which circuit divides the current among the various output electrodes in predetermined fashion, while permitting essentially all of the output power to be utilized into a two-terminal load.

It is a further object of the invention to provide a nondissipative current distribution circuit for an MHD generator or like power generator operating into a resonant converter circuit, or nonresonant converter circuit with power transformer.

These and other objects of the present invention will become apparent as the detailed description of certain representative embodiments thereof proceeds.

SUMMARY OF THE INVENTION

In accordance with the foregoing principles and objects of the present invention, a nondissipative current distribution circuit for a power source, such as a magnetohydrodynamic generator, that delivers its output current through a first plurality of positive electrodes and a second plurality of negative electrodes (including plural positive and negative electrode pairs) and provides a predetermined current distribution among the electrodes, is described, and comprises a transformer including first and second windings, the second winding including means for connection to a load, the first winding having plural adjustable taps intermediate its ends, an inductor connected at one end to one end of the first transformer winding and at the other end to a plurality of capacitors connected respectively to each electrode, and a first plurality of silicon controlled rectifiers connected, respectively, between each positive electrode and a tap or the second end of the first transformer winding, and a second plurality of silicon controlled rectifiers connected, respectively, between each negative electrode and a tap or the second end of the first transformer winding, the first plurality of rectifiers configured to conduct alternately with the second plurality of rectifiers. In alternative embodiments, mechanical switches are connected between each electrode and tap or winding end, all switches configured to operate in unison, with an RC filter connected across each switch; or a silicon controlled rectifier switch is connected between each electrode and tap or winding end, all switches configured to operate in unison, with a commutating circuit connected across each rectifier switch.

DESCRIPTION OF THE DRAWINGS

The present invention will be more clearly understood from the following detailed description of representative embodiments thereof read in conjunction with the accompanying drawings wherein:

FIG. 1b illustrates a representative linear plot (no scale) of current output pulses versus time for the circuit of FIG. 1a.

DETAILED DESCRIPTION

The present invention employs a tapped transformer in an inverter circuit along with suitable controlled switches and reactive components, which combine the power from a source having more than two output current terminals, into output power at a two terminal load. The transformer taps and other critical components may be adjusted and placed to force the load current to partition among the source electrodes in a predetermined manner.

Figure 1A:
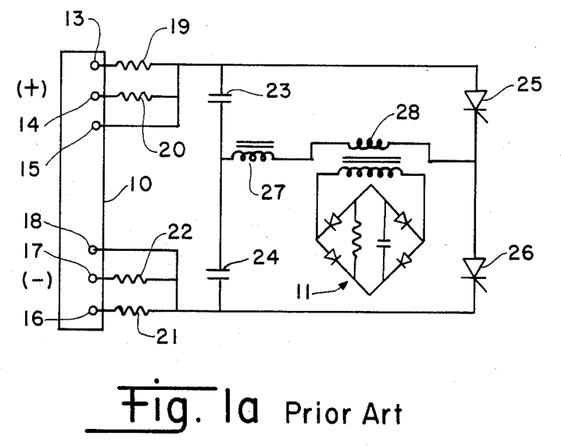
FIG. 1a illustrates prior art circuitry for connecting an MHD generator to drive a resonant converter into a two-terminal load.

Referring now to FIG. 1a of the drawings, shown therein is a schematic of magnetohydrodynamic (MHD) generator 10 connected to and driving in conventional fashion a resonant converter into a two-terminal resistive load 11. MHD generator 10 has a plurality of positive and negative output electrodes such as electrodes 13,14,15 illustrated at the positive (+) power output end, and electrodes 16,17,18 at the negative (−) end. In order to force the current to divide substantially equally among the various output electrodes 13–15 and 16–18, ballast resistors are normally placed in series with each load terminal, as suggested in FIG. 1a by resistors 19–22, which are normally variable to allow adjustment to the desired resistance values.

Figure 1B:
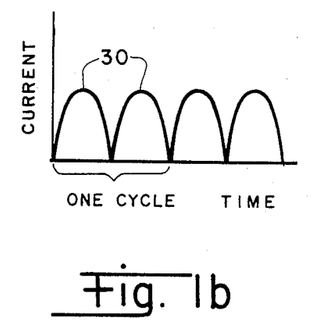

MHD generator 10 may be used to drive a two-terminal load 11 through an intermediate dc-to-dc converter of the resonant type, such as illustrated in the prior art converter circuitry of FIG. 1a, including capacitors 23,24, silicon controlled rectifiers (SCR) 25,26 and inductance 27, and transformer 28 connected across load 11. The converter circuitry of FIG. 1a is sometimes referred to as a Schwarz converter. The particular method of connecting output transformer 28 into the resonant circuit, such as illustrated in FIG. 1a, is often referred to as "current feed". The output current of MHD generator 10 as switched by SCRs 25, 26 will typically have a fixed pulse frequency in the range 60 Hz to about 10 kHz; precise control of the frequency is usually not necessary. The converter circuit of FIG. 1a is configured such that in each current cycle SCR 25 conducts current into the converter for one half of each phase cycle and SCR 26 conducts current for the other half, which results in total direct current pulses out of generator 10 represented by the plot of FIG. 1b. The total output current versus time function drawn from MHD generator 10 through the circuitry of FIG. 1a is in pulses 30, each having approximately sine wave shape. The ratio of total output voltage to total load current is ordinarily approximately one ohm for an open cycle combustion driven MHD generator 10 of about one megawatt. The resonant frequency for the converter circuit of FIG. 1a is determined by the internal resistance of generator 10 and by the values of capacitors 23,24 and inductance 27.

Figure 2A:
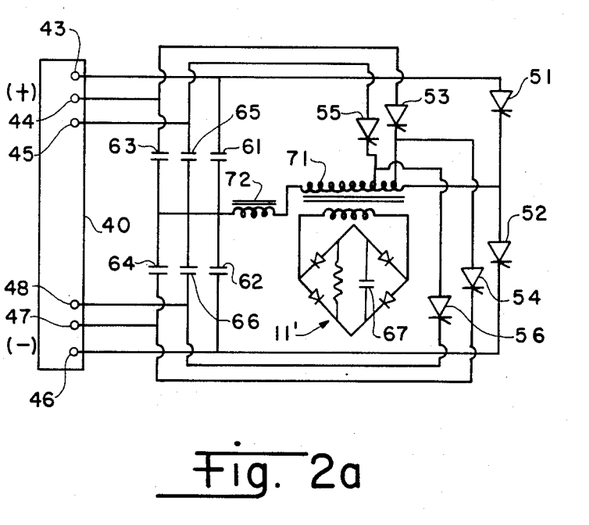
FIG. 2a illustrates novel circuitry of the present invention to divide load current without power loss.
Figure 2B:
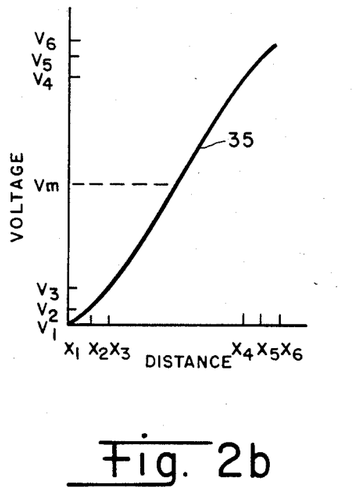
FIG. 2b is a representative linear plot (no scale) of voltage versus distance and electrode number along the gas flow direction of an MHD generator.

Referring now to FIG. 2a, illustrated therein is one embodiment of the circuit of the present invention. A DC source in the form of MHD generator 40 has a plurality of positive (+) and negative (−) electrodes as represented, respectively, by electrodes 43,44,45 at the positive end and electrodes 46,47,48 at the negative end. It may be desired to provide substantially equal current distribution (or other predetermined distribution) among the electrode pairs of MHD generator 40. For equal current distribution among the electrode pairs, usually the voltage differences between electrodes 46,47 (i.e., $V_2-V_1$) and between electrodes 43,44 (i.e., $V_6-V_5$) are equal, and the voltage differences between electrodes 44,45 (i.e., $V_5-V_4$) and between electrodes 47,48 (i.e., $V_3-V_2$) are equal. In other words, the plot of voltage V versus distance X along the MHD generator channel length, as presented graphically as graph 35 in FIG. 2b, is symmetrical between its upper and lower ends. This assumption may be closely approximated through suitable design and operation of MHD generator 40.

Between each pair of electrodes is connected in parallel a series connected SCR pair and a series connected capacitor pair, viz., SCRs 51, 52 and capacitors 61,62 between electrodes 43,46; SCRs 53,54 and capacitors 63,64 between electrodes 44,47; and SCRs 55,56 and capacitors 65,66 between electrodes 45,48. MHD generator 40 may have more output current electrode pairs than the three illustrated in the drawings. It is understood, therefore, that, in the practice of the invention herein taught, an appropriate number of SCR and capacitor pairs would be included in the circuit consistent with the number of terminal electrode pairs on the MHD generator, and that the principles governing the operation of the circuit of the invention for this and later described embodiments are applicable to power sources delivering current through a different number of terminal electrode pairs than that illustrated herein, as would occur to one with skill in the filed of this invention. Further, only those components of the converter circuit embodiments are shown which are essential to an understanding of the invention; one skilled in the art will further include trigger circuits, snubbing circuits, etc., which are needed to maintain proper control of the operating parameters of the converter circuitry.

Transformer 71 and inductance 72 are connected intermediate the junctures of each capacitor and SCR pair as illustrated in FIG. 2a. Transformer 71 has an appropriate number of taps (2) (i.e., one less than the number of electrode pairs), on one of its windings, consistent with the number of electrode pairs (3), as suggested in FIG. 2a, and the second winding is connected across two terminal load 11'. Each tap of transformer 71 is connected, respectively, at the junctures of SCRs 53,54 and SCRs 55,56. Transformer 71 may thus be configured to offer impedances to the various MHD generator electrode pairs to force substantially equal currents (or other predetermined current distribution) through the various load terminals of MHD generator 40 as represented by the three illustrated electrode pairs.

Transformer 71 may preferably have adjustable taps the desired positioning of which is achieved essentially by trial and error after a rough estimate based on the expected voltage distribution along the primary of transformer 71 as compared to the required MHD generator 40 channel voltage distribution.

In the operation of the converter circuit of the invention as embodied in FIG. 2a, lower SCRs 52,54,56 are switched on simultaneously, while upper SCRs 51,53,55 are nonconducting; in the next half-cycle, SCRs 52,54,56 are switched off while SCRs 51,53,55 are triggered to conduct. That alternating sequence represents one complete cycle, and repetition thereof results in a pulsed current output similar to that illustrated in FIG. 1b. To provide a resonant frequency the same as that of the FIG. 1a circuit, capacitors 61–66 may each be set equal to $\frac{1}{3}$ the value of capacitors 23 or 24, other things being equal.

When rectifier filter capacitor 67 is large enough to effectively smooth out the ripple across load 11' of FIG. 2a, the voltage reflected into the primary of transformer 71 behaves as dc voltage as far as the resonant frequency is concerned. In that case the resonant frequency is independent of the reflection of a load resistance into the generator circuit. If the converter is operated as a dc-to-ac converter, where there is no rectifier at the output, then the load resistance reflected into load transformer 71 primary will affect the value of the resonant frequency. Accordingly, the values of capacitors 61–66 and of inductance 72 will need to be adjusted in order to maintain a suitable cycling frequency and its associated Q-value. The Q value for the series resonance should be maintained greater than about 2 in order to maintain oscillation and suitable waveforms in the converter.

Figure 3:
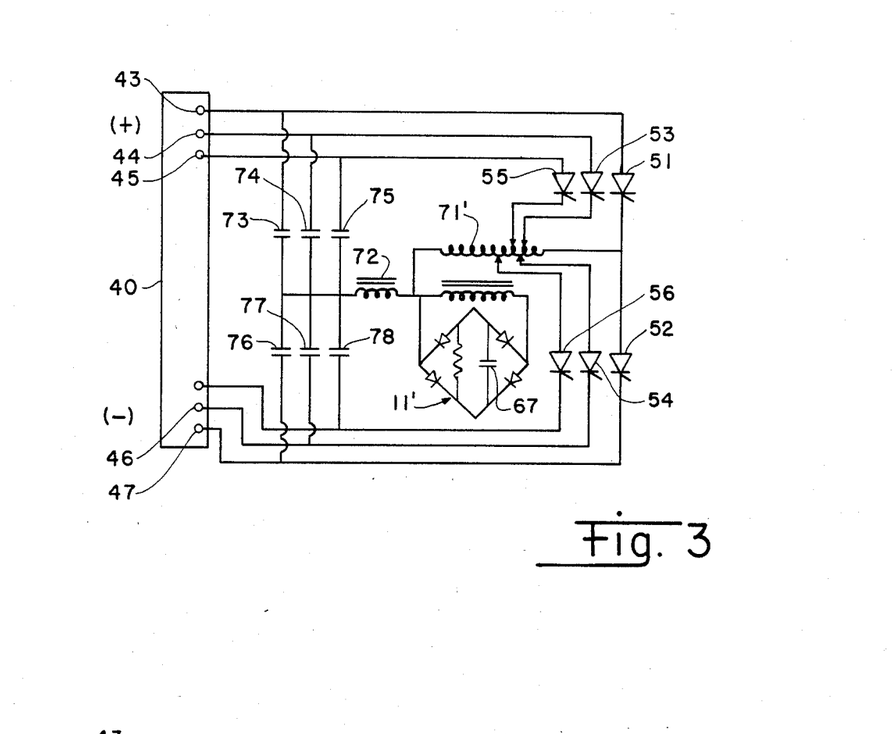
FIG. 3 is a variation of the FIG. 2a circuit wherein a transformer with adjustable staggerable taps is used to compensate for unsymmetrical voltage distribution along the MHD generator channel gas flow direction.

When the V vs X curve 35 (FIG. 2b) for MHD generator 40 channel is not symmetrical end for end, as is usually the case to some degree, a modification of the FIG. 2a circuit illustrated in FIG. 3 may be used. As shown in FIG. 3, transformer 71' has additional taps in order to connect to upper SCRs 53,55, and to lower SCRs 54,56. The taps on the transformer may be staggered in such positions that suitable impedance is offered to the resonant current for each MHD output electrode voltage, so that currents for each tap may be equalized.

The schematic of FIG. 3 may be used preferably when the voltage along the MHD channel must be maximum at the channel end. In some cases the voltage along the channel might have a maximum not at the end, although such operation would usually be aberrant. However, adjustable taps could be used which comprise a set of tap positions providing equalized currents among the MHD electrodes. This mode of operation is not illustrated, since it seems to follow logically from the above teachings. If the currents desired from the electrodes are not meant to be equalized, but other than equal currents are specified, there likewise will be a set of tap positions which will produce the specified current distribution.

Figure 4:
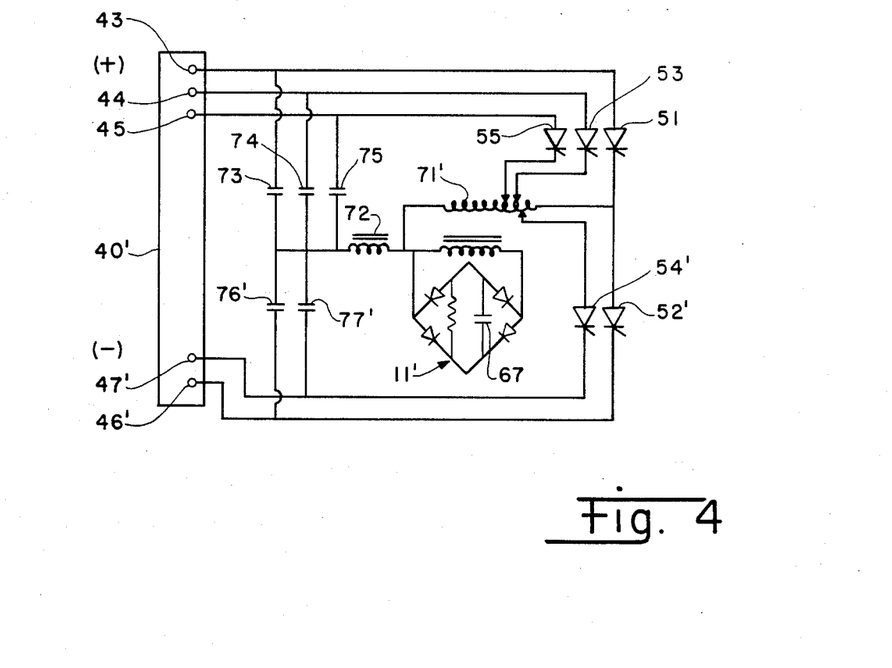
FIG. 4 is a variation of the FIG. 2a circuit wherein the number of positive electrodes of the generator does not equal the number of negative electrodes, either of which numbers may in general be arbitrarily selected.

FIG. 4 illustrates the application of the invention herein to generator 40' having a number of positive electrodes different from the number of negative electrodes. The circuit of FIG. 4 may be viewed as a variation of the FIG. 3 circuit with one of the negative electrodes of generator 40' removed. Generator 40' is shown therefore with three positive and two negative electrodes, although, as mentioned above, the number of electrodes is not critical within the scope of these teachings. Consistent with the number of negative electrodes, one fewer capacitor-SCR pairs (i.e., 76',52' and 77',54') are included in the lower portion of the circuit between the negative electrodes and transformer 71'. There is accordingly one fewer transformer 71' taps consistent with the fewer number of SCRs.

With reference now to the circuits illustrated in FIGS. 2a and 3, proportioning of resonating circuit capacitors 61–66 and 73–78, may be accomplished according to the following example:

(1) The required average voltage and current distribution among the generator electrodes may be specified from the generator design as for example in the six-terminal design listed in Table I.

TABLE I

| Generator Electrode No. | Voltage, V | Current, A |
| --- | --- | --- |
| Lower #1 | 0 | 200 |
| Lower #2 | 50 | 300 |
| Lower #3 | 120 | 250 |
| Upper #4 | 800 | 200 |
| Upper #5 | 860 | 250 |
| Upper #6 | 1000 | 300 |

The numbers selected are rather arbitrary for simplicity of illustration.

(2) A suitable average operating voltage level, $V_m$, for the common connection of the capacitors is then selected. For the circuit of FIG. 2a, $V_m$ was selected near the middle voltage of the generator. For this example, an arbitrary voltage of 450 volts may be selected using electrode #1 as a reference. The voltage will usually be near the mid-point of the two extreme positive and negative electrodes of the generator.

(3) The total oscillator capacitance to resonate in either the upper or lower branches of the oscillating circuit may be chosen to provide the desired oscillation Q-value.

(4) The total oscillator capacitance in the other branches may be selected to provide a voltage $V_m$ as previously specified. Where $C_U$ and $C_L$ are the respective sums of the upper and lower capacitances with $V_U$ and $V_L$ the upper and lower average voltages, respectively, then, $$V_L/V_U = C_U/C_L \qquad (1)$$

In this example, where $C_L = 0.5$ mfd, $C_U = 0.5$ mfd $\times 450/550 = 0.41$ mfd.

(5) The individual upper and lower capacitances are chosen to be proportional to their respective electrode average current and inversely proportional to their respective electrode average voltage measured from $V_m$. For example, $$C_L = C_1 + C_2 + C_3 = 0.5 \text{ mfd;} \qquad (2)$$

$$C_U = C_4 + C_5 + C_6 = 0.41 \text{ mfd,} \qquad (3)$$

where for the Fig. 2a circuit, $C_1$ through $C_6$ are taken as the capacitance values for capacitors 62,64,66,65,63,61, respectively. Where $K_L$ and $K_U$ are constants of proportionality, and $I_1, I_2, I_3, I_4, I_5, I_6$ and $V_1, V_2, V_3, V_4, V_5, V_6$ are the values for current and voltage for each respective capacitor, $$C_1 = K_L I_1 / V_1 \qquad (4)$$

$$C_2 = K_L I_2 / V_2 \qquad (5)$$

$$C_3 = K_L I_3 / V_3 \qquad (6)$$

Equations (2), (4), (5), and (6) comprise a set of four equations with four unknowns from which each capacitance value may be calulated; in this example $C_1 = 0.114$ mfd, $C_2 = 0.192$ mfd, and $C_3 = 0.194$ mfd.

Similarly, using Equation (3) four equations and four unknowns are found for the other set of capacitances $C_4$ through $C_6$:

$$C_4 = K_U I_4 / V_4 \qquad (7)$$

$$C_5 = K_U I_5 / V_5 \qquad (8)$$

$$C_6 = K_U I_6 / V_6$$

$$C_4 + C_5 + C_6 = 0.41 \text{ mfd}$$

from which values of $C_4$, $C_5$, and $C_6$ may be calculated.

Several converter types exist in the art, and the following describes how some of these converter types can be employed according to the principles and objects of the present invention.

Figure 5:
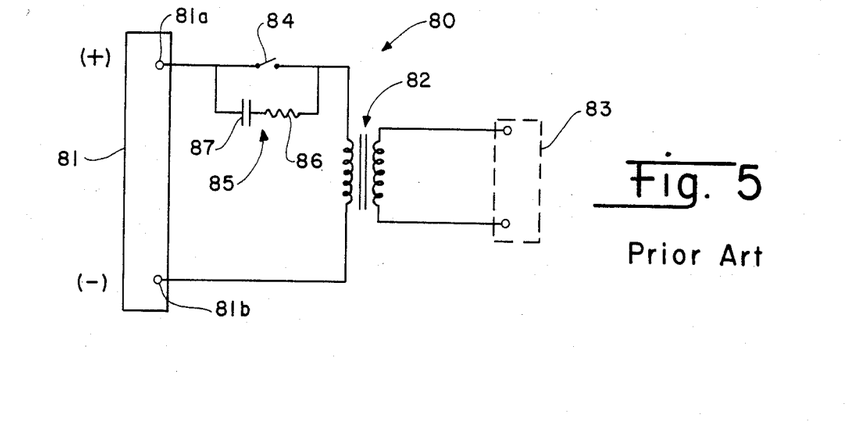
FIG. 5 is a schematic of a typical prior art mechanically switched half wave or "single ended" inverter.

Non-Resonant Inverter Circuits:

A mechanically switched inverter typically interrupts the source current through a transformer primary by a vibrator switch. The AC in the transformer secondary may be rectified when DC is needed for the load. FIG. 5 shows a simple half wave mechanically switched inverter circuit 80 which may typically comprise source 81 of DC power having a pair of positive (+) and negative (−) terminals 81a, 81b. Transformer 82 has its windings connected respectively across source 81 and AC output or load 83. Inverter circuit 80 is characterized by a mechanically operated switch 84 on the primary or transformer 82, with RC filter 85 comprising resistance 86 and capacitance 87 connected across switch 84 to damp out high voltage spikes across switch 84 without dissipating substantial amounts of power in the circuit as through resistance 86.

Figure 6:
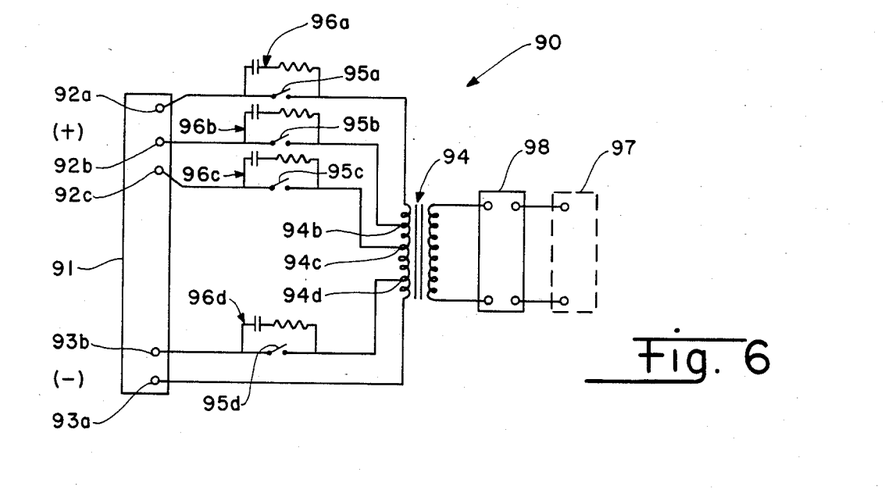
FIG. 6 is a schematic of the FIG. 5 circuit adapted to the multiple electrode circuit concept of the present invention.

A schematic of a representative mechanically switched inverter circuit 90 according to the present invention is illustrated in FIG. 6. DC power source 91 having a plurality of positive (+) output terminals 92a,b,c and a different (greater or lesser) plurality of negative (−) output terminals 93a,b may be required to provide current through the respective output terminals in predetermined distribution. Source 91 may be in the form of an MHD generator having electrodes in the form of terminals 92a,b,c and 93a,b along the generator channel length. End terminals 92a,93a are connected to the terminals of the primary winding of transformer 94, and all intermediate terminals 92b,c and 93b are connected to intermediate adjustable taps 94b,c,d of transformer 94 substantially as shown. Mechanically operated switch 95 is provided in each line intermediate each respective terminal-to-tap connection as required and as suggested by switches 95a–d in FIG. 6. All switches 95 are configured to operate in synchrony. An RC filter 96 comprising capacitance and resistance of respective predetermined sizes is connected across each switch 95 (viz., 96a–d as suggested in FIG. 6) for purpose equivalent to that of filter 85 of FIG. 5. Each tap position 94b,c,d of transformer 94 may be adjusted to provide predetermined current distribution through each terminal 92a,b,c,93a,b. The secondary of transformer 94 may be connected across load 97 through rectifier or filter 98.

Figure 7:
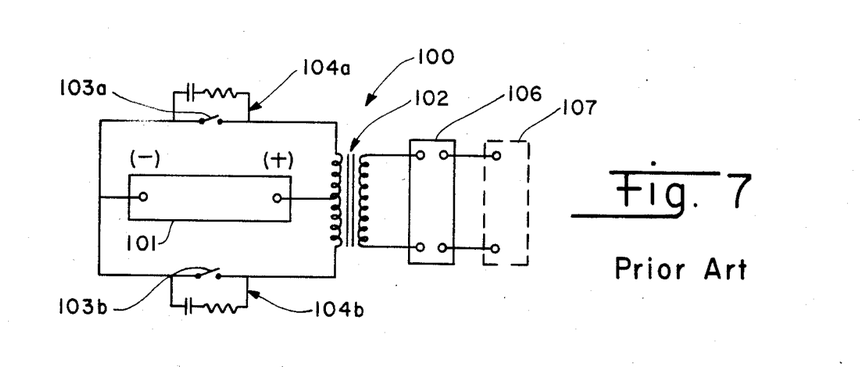
FIG. 7 is a schematic of a typical prior art mechanically switched "push-pull" or "parallel" inverter circuit.

Referring now to FIG. 7, shown therein is a conventional full wave (or "push-pull") inverter circuit 100 connected to a two-terminal power source 101. Transformer 102 is centertapped at its primary to which is connected one terminal of power source 101. A pair of mechanically operated switches 103a,b, each with an RC filter 104,a,b interconnect the remaining terminal of source 101 to transformer 102, substantially as shown in FIG. 7. Switches 103a,b are typically operated 180° out of phase with each other in order to provide the full wave character of the circuit. As in earlier illustrated circuits, the secondary of transformer 102 may be connected through rectifier or filter 106 to drive load 107.

Figure 8:
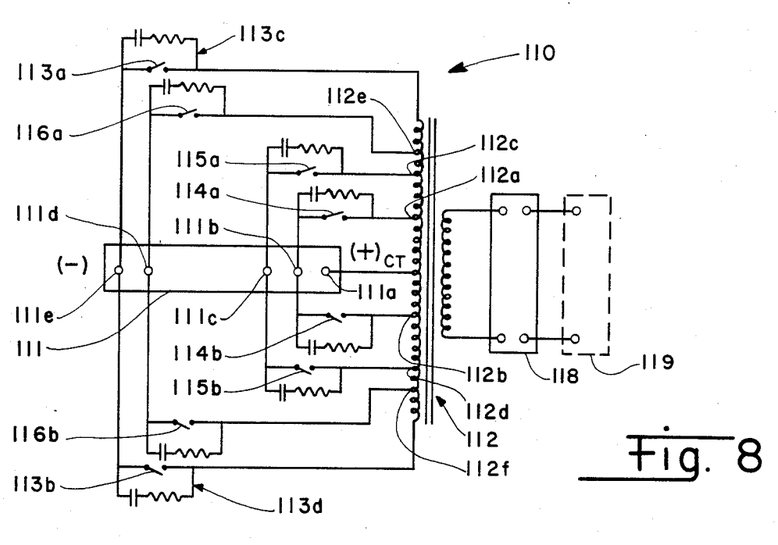
FIG. 8 is a schematic of a multiple electrode power source with mechanically switched push-pull or paraallel inverter circuit of the present invention.

FIG. 8 illustrates a push-pull type inverter circuit 110 of the present invention as applied to a multiple terminal DC power source 111. As in earlier embodiments, source 111 may have a plurality of positive electrodes 111a,b,c and another plurality of negative electrodes 111d,e. Transformer 112 may preferably be center tapped (CT) to one end of source 111, as to electrode 111a. The other end electrode 111e may be connected to the respective ends of the primary winding of transformer 112 through a pair of mechanical switches 113a,b, each respectively with an appropriately sized RC filter 113c,113d thereacross. All intermediate electrodes 111b,c,d are connected through respective pairs of switches 114a,b, 115a,b, 116a,b to respective adjustable transformer taps 112a,b,c,d,e,f. Each mechanical switch 113–116 has an RC filter thereacross substantially as shown for purposes mentioned previously in relation to other embodiments. In the operation of circuit 110, switches 113a,114a,115a,116a operate synchronously, and switches 113b,114b,115b,116b operate synchronously 180° out of phase with switches 113a–116a. Rectifier or filter 118 and load 119 may be connected across the secondary winding of transformer 112 as suggested in FIG. 8. A circuit configured in accordance with the schematic of FIG. 8 may be referred to as "forced commutated" and may comprise transistor, thyratron or solid state controlled rectifiers substituted as switching components.

Figure 9:
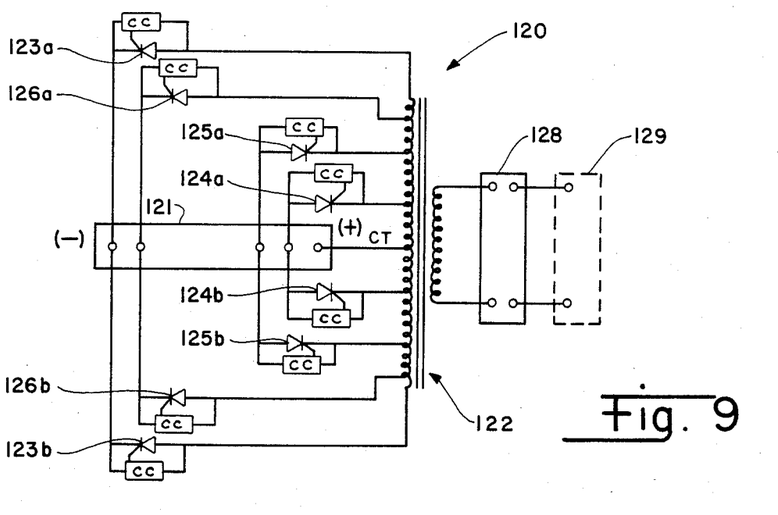
FIG. 9 is a schematic of a multiple electrode power source with SCR switched push-pull or parallel inverter circuit of the present invention.

FIG. 9 illustrates the push-pull inverter circuit of FIG. 8 wherein the mechanical switches of circuit 110 are replaced with silicon controlled rectifier (SCR) switches 123a,b, 124a,b, 125a,b, 126a,b in circuit 120 of FIG. 9. SCR's 123a,b are connected to respective end terminals of transformer 122 and SCR's 124a,b, 125a,b, 126a,b, are connected to intermediate adjustable taps on transformer 122. Each SCR is controlled by a commutating circuit CC, as suggested in FIG. 9, the details of which are not shown as being outside the scope of these teachings. The commutating circuits are, however, configured to switch SCR's 123a,124a,125a,126a (above center tap CT of transformer 122 in FIG. 9) synchronously, and SCR's 123b,124b,125b,126b (below CT) synchronously 180° out of phase with the upper (a) SCR set. Depending on the particular type of switch used in circuit 120, the commutating circuits may need to include an RLC circuit to smooth and control switching transients, the details of which circuits as would occur immediately to one with skill in the field of the present invention.

Buck-Boost Regulator:

A "buck-boost" regulator belongs to a class of circuits which interrupt current from an energy storage component such as a capacitor, into a series of pulses. The power source maintains a desirable average charge in the energy storage component, while the output power is controlled by adjusting the charge and discharge cycle timing (duty cycle) of the energy storage element through a switch such as a transistor switch. The resulting pulsated current is carried through the primary of a transformer; the secondary goes to the load circuit through an appropriate filter or rectifier. By applying a negative feedback loop to the switch, fed from the load, regulating action can be accomplished through adjusting the switch duty cycle.

Figure 10:
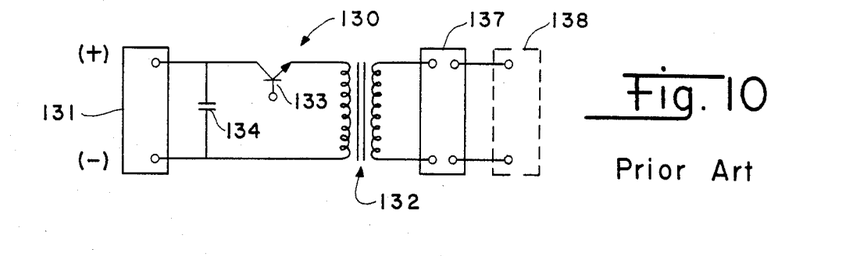
FIG. 10 is a typical prior art simplified buck-boost circuit using a transistor switch.

FIG. 10 illustrates a conventional buck-boost circuit 130 connecting DC source 131 to load 138 through transformer 132 and rectifier 137. Circuit 130 includes transistor switch 133 and capacitor 134 of large capacitance. For simplicity of illustration, no feed back loop is included, and, therefore, circuit 130 as illustrated may be referred to as a converter circuit.

Figure 11:
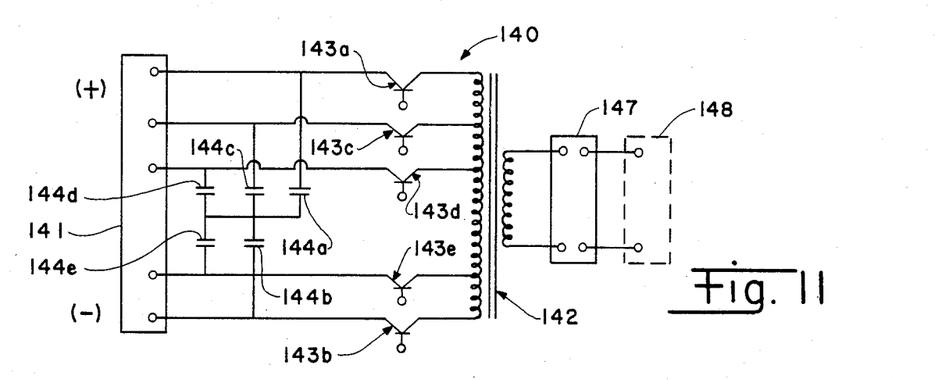
FIG. 11 is a schematic of a multiple electrode power source with transistor switched buck-boost type circuit of the present invention.

FIG. 11 presents a buck-boost type circuit 140 adapted according to the present invention to connect to multiple terminal power source 141 (having three representative positive electrodes and two negative electrodes as in previous examples), and including transformer 142 with its secondary connected to rectifier/filter 147 and load 148. Transistor switches 143a,b connect the end electrodes of power source 141 to the end terminals of the primary of transformer 142, and switches 143c,d,e interconnect the intermediate electrodes of source 141 to intermediate adjustable taps on transformer 142. Separate energy storage components are provided for each electrode of source 141 in the form of capacitors 144a,b,c,d,e interconnecting each electrode and a common juncture as illustrated. The capacitance of each capacitor 144a-e may be selected to require respective average charging currents corresponding to the desired current distribution in each electrode loop. All transistor switches 143a-e are switched in unison.

Figure 12:
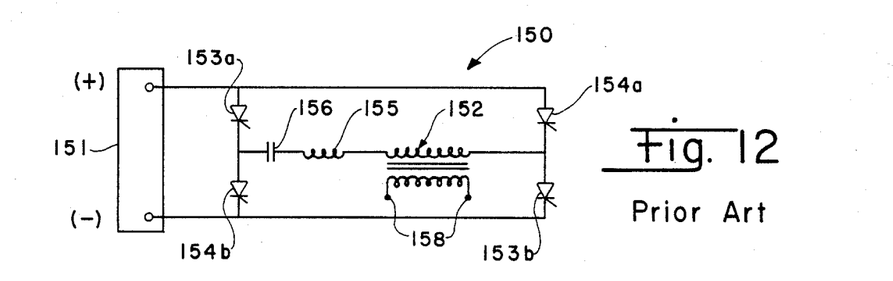
FIG. 12 is a typical prior art bridge driven series resonant converter.

Resonant Converters:

Generally, the resonant converter interrupts current through the primary winding of a transformer at a time in an oscillatory cycle when the current is nearly of zero amplitude. The switching frequency equals the oscillatory frequency of an RLC circuit around which the entire inverter is designed. Switching at low resonant current amplitude minimizes inductive voltage spikes in the switch circuit and provides a reverse current swing through the switch or a reverse potential across the switch so that a thyratron, thyristor or SCR is switched off (commutated) with the assistance of the resonant effect. There are several configurations for the resonant circuit. FIG. 12 illustrates a typical prior art bridge driven series resonant converter circuit 150 including transformer 152 output to load 158, and two terminal input from DC source 151. SCR's 153a,b are switched in unison, and SCR's 154a,b are switched in unison 180° out of phase with SCR's 153a,b. Inductance 155 and capacitance 156 are sized appropriately.

Figure 13:
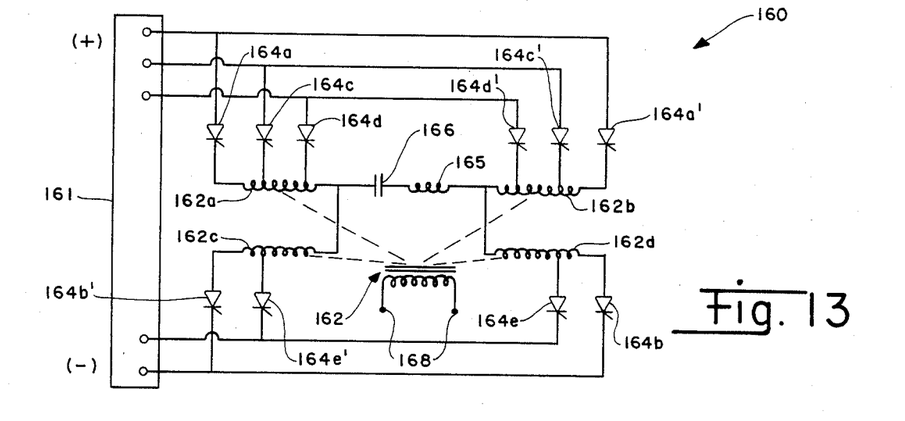
FIG. 13 is a schematic of a multiple electrode power source with bridge driven series resonant converter circuit according to the present invention.

FIG. 13 presents a bridge driven series resonant converter circuit 160 of the present invention connected to multiple electrode DC power source 161 and having transformer 162 output to load 168. Transformer 162 comprises four primary windings 162a–d connected in parallel pairs between the positive and negative ends of source 161, each pair connected in series with oscillatory pair inductance 165 and capacitor 166 of suitable size. Each intermediate electrode of source 161 is connected to a pair of respective adjustable taps of primary windings 162a–d of transformer 162 to achieve the desired average current through each electrode. Each electrode is connected to its respective transformer connection through an SCR 164a,a', 164b,b', 164c,c', 164d,d' and 164e,e', respectively (in pairs corresponding to the number of electrodes on source 161); in the embodiment of FIG. 13, SCR's 164a-e are all operated simultaneously, and SCR's 164a'-e' are operated simultaneously 180° out of phase with SCR's 164a-e. The primary windings of transformer 162 are wound in the same sense with respect to the direction of current flow provided by the "on" condition of the associated SCR's.

Figure 14:
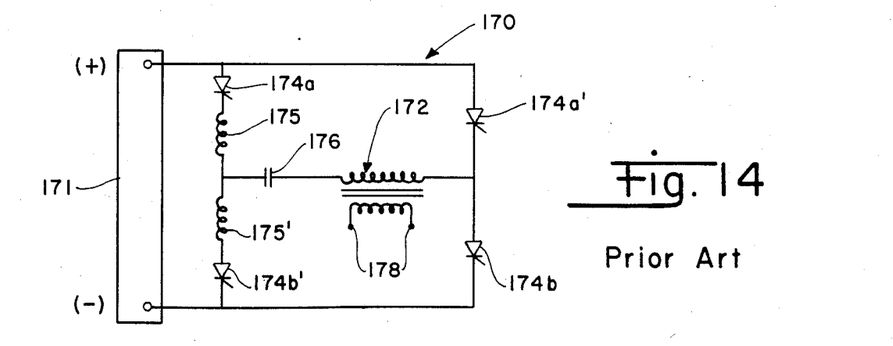
FIG. 14 is a typical prior art full wave two-terminal current feed resonant converter circuit with common resonance capacitor.

FIG. 14 presents a typical prior art full wave current feed circuit 170 connected to two terminal DC source 171 and having transformer 172 output to load 178. A pair of current loops is defined, one loop including SCR's 174a,b, the primary of transformer 172, capacitance 176, and inductance 175, and the other loop including SCR's 174a',b', transformer 172 primary, capacitance 176 and inductance 175'. A common capacitance 176 for the oscillating circuit distinguishes this converter style from that illustrated in FIG. 1a. Capacitor 176 and inductors 175,175' are sized corresponding to the size of power source 171 and the anticipated current flow and according to establishing a Q value for the circuit, at the chosen switching frequency, great enough to provide approximately sinusoidal current oscillations therein. SCR's 174a and 174b' prevent shorting of the power source before start of oscillations.

Figure 15:
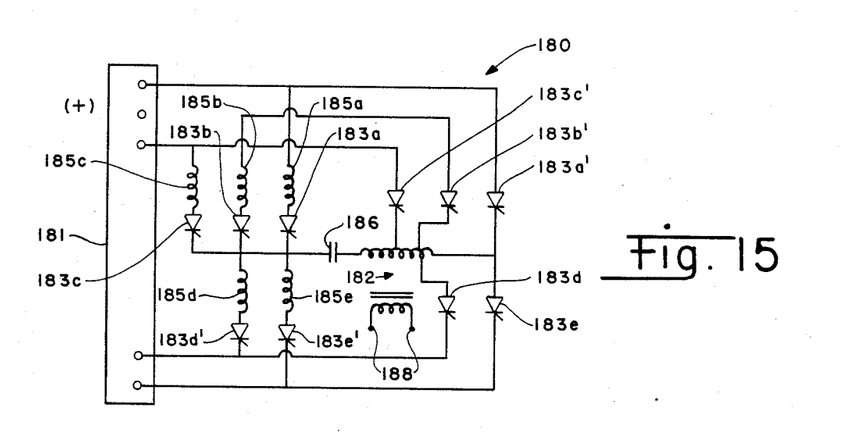
FIG. 15 is a schematic of a multiple electrode full wave "current" feed series resonant circuit with common resonance capacitor according to the present invention.

FIG. 15 presents a full wave current feed circuit 180 of the present invention connected to multiple electrode DC power source 181, and having transformer 182 output to load 188. Capacitor 186 of appropriate size according to the prospective current flow and oscillatory requirements is included in series with the primary of transformer 182. Inductances 185a–e and SCR's 183a,b,c,d',e' interconnect the respective electrodes of source 181 with capacitor 186 as shown. SCR's 183a',b', c'd,e interconnect the electrodes of source 181 with an end terminal of transformer 182 or its intermediate adjustable taps as illustrated. Values of inductances 185a–e and capacitor 186 are selected so that the total peak current from the source is the same each half cycle and so that the current delivered by the respective electrodes is the value desired from the circuit; values of inductances 185a–e and capacitor 186 must also be such as to suitably resonate at the desired switching frequency. SCR's 183*a–e* are all operated in synchrony, and SCR's 183*a'–e'* are operated in synchrony 180° out or phase with SCR's 183*a–e*.

Figure 16:
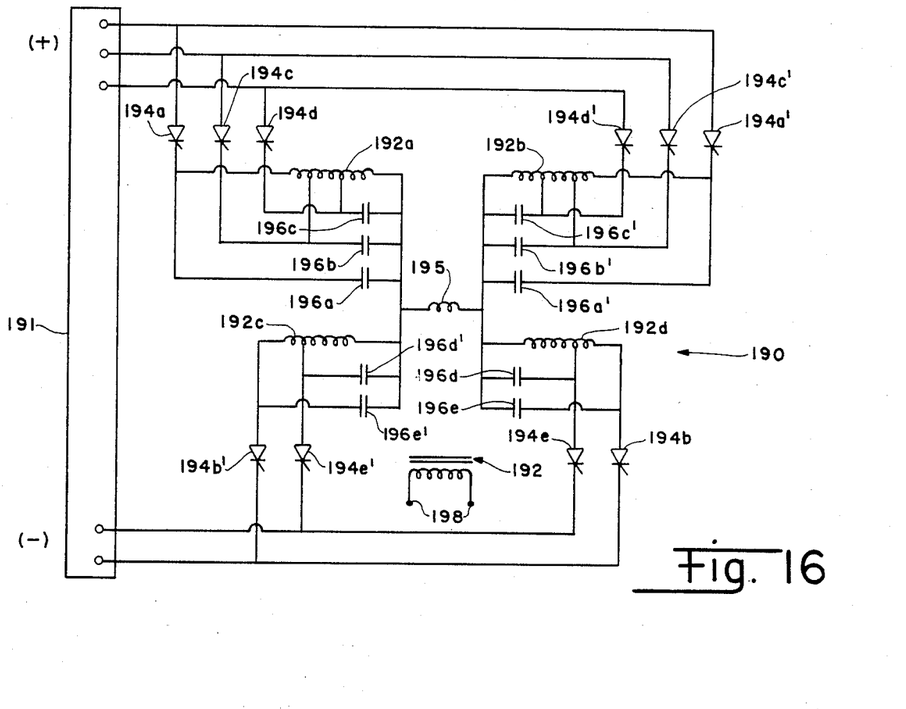
FIG. 16 is a schematic of an alternate bridge driven "voltage" feed series resonant circuit of the present invention.

FIG. 16 presents a bridge driven series resonant converter circuit 190 of the present invention connected to multiple electrode DC power source 191 and having transformer 192 with four primary windings 192 *a–d* and a secondary output to load 198. Circuit 190 is similar to circuit 160 presented in FIG. 13 except that individual capacitances 196*a–e* and 196*a'–e'* are included in the respective current loops. In manner similar to the circuit 160 of FIG. 13, SCR's 194*a–e* operate in synchrony, and SCR's 194*a'–e'* operate in synchrony 180° out of phase with SCR's 194*a–e*.

Figure 17:
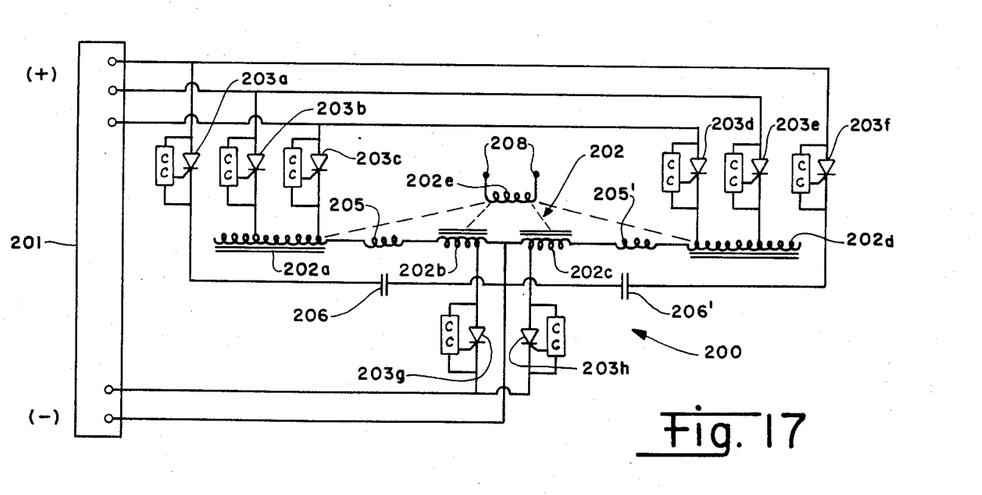
FIG. 17 is a schematic of a parallel resonant full wave push-pull "current" feed inverter circuit of the present invention.
Figure 18:
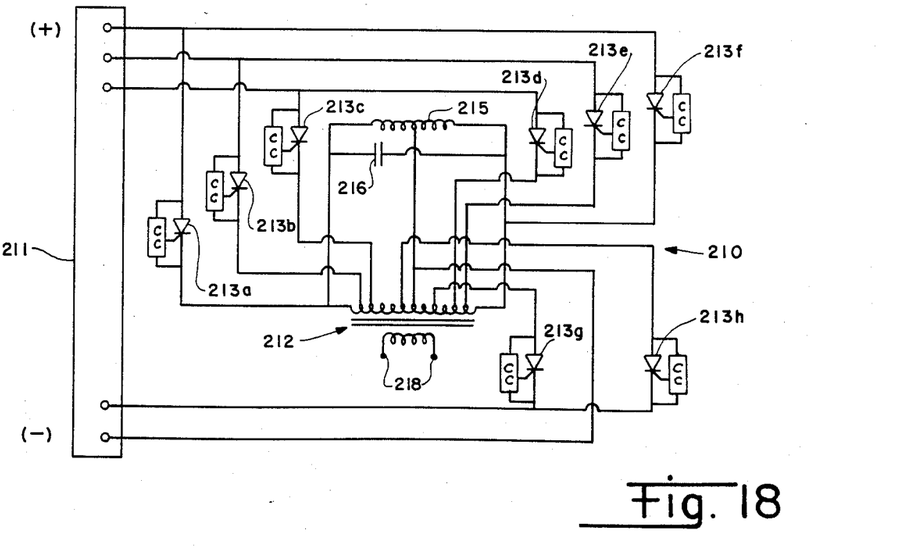
FIG. 18 is a schematic of a parallel resonant full wave push-pull "voltage" feed inverter circuit of the present invention.

FIGS. 17 and 18 present parallel resonant full wave push-pull inverter circuits 200,210 of the present invention connected, respectively, to multiple electrode DC power sources 201,211. Circuit 200 of FIG. 17 is referred to as "current" feed, and circuit 210 of FIG. 18 is referred to as "voltage" feed. Commutator circuits labeled CC across each SCR 203*a–h* and 213*a–h* serve functions equivalent to that included in previous described embodiments. In circuit 200 (FIG. 17) all transformer windings 202*a–d* are on a common core closely coupled with secondary winding 202*e* output to load 208.

The description of this invention is in the context of single phase inverter application. However, as well known in the art, multi-phase inversion is accomplished by connecting sets of like inverters in parallel when properly switched and each inverter integrated with one of the multi-phase windings of an output transformer. The principles of this invention apply straight forwardly thus to multi-phase inverters.

In addition, the distribution circuitry of the present invention has been described in reference to MHD generators, but may be applicable to any power source for supplying direct current or pulsed direct current to a converter through multiple output electrodes to divide the output current among the output electrodes in predetermined fashion.

The present invention therefore provides a novel nondissipative current distribution circuit for a power source, such as an MHD generator, wherein output current is delivered through more than one pair of output electrodes. It is understood that certain modifications to the invention as described may be made, as might occur to one with skill in the field of this invention, within the scope of the appended claims. Therefore, all embodiments contemplated hereunder which achieve the objects of the invention have not been shown in complete detail. Other embodiments may be developed without departing from the spirit of the invention or from the scope of the appended claims.

I claim:

1. A converter circuit for a power source delivering output current through more than one pair of electrodes, said circuit providing predetermined current distribution among said electrode pairs, comprising:
    a. a pair of capacitors of respective predetermined sizes connected in series circuit relationship and first and second controlled rectifiers connected in series circuit relationship from each positive to each negative electrode of each electrode pair, each pair of said rectifiers connected in parallel relationship to each corresponding capacitor pair, said first rectifiers configured to conduct alternately with said second rectifiers;
    b. inductor means having first and second ends and connected at said first end to the juncture of each said capacitor pair;
    c. a transformer having first and second windings, said first winding having first and second ends and connected at said first end thereof to the juncture of one said first and second rectifier pair, and at said second end thereof to said second end of said inductor means;
    d. said first winding having a plurality of taps intermediate said first and second ends thereof, each of said taps connected to the juncture of one of the remainder of said rectifier pairs; and
    e. said second winding having means for connection to a load.

2. The circuit as recited in claim 1 wherein said first winding has a number of taps equal to one less than the number of electrode pairs on said power source.

3. The circuit as recited in claim 2 wherein said taps are adjustable.

4. The circuit as recited in claim 1 wherein the values of said capacitors and said inductor means are selected to maintain the Q value of said circuit at two or more.

5. A converter circuit for a power source delivering output current through a first plurality of positive electrodes and a second plurality of negative electrodes, said circuit providing predetermined current distribution among said electrodes, comprising:
    a. a transformer having first and second windings, said first winding having first and second ends, and said second winding having means for connection to a load;
    b. said first winding having a third plurality of taps intermediate said first and second ends thereof;
    c. inductor means having first and second ends and connected at said first end thereof to said first end of said first winding;
    d. a capacitor of preselected capacitance connected between each said electrode and said second end of said inductor means; and
    e. a first plurality of rectifiers connected, respectively, between each said positive electrode and one of said taps and second end of said first winding, and a second plurality of rectifiers connected, respectively, between each said negative electrode and one of said taps and second end of said first winding, said first plurality of rectifiers configured to conduct alternately with said second plurality of rectifiers.

6. The circuit as recited in claim 5 wherein said electrodes are at different respective electrical potentials, and said second end of said first winding is connected through one of said first plurality of rectifiers to said electrode at greatest positive potential and through one of said second plurality of rectifiers to said electrode at greatest negative potential.

7. The circuit as recited in claim 6 wherein said taps are adjustable.

8. The circuit as recited in claim 5 wherein the values of said capacitors and said inductor means are selected to maintain the Q value of said circuit at two or more.

9. An inverter circuit for a power source delivering output current through a first plurality of positive electrodes and a second plurality of negative electrodes, said circuit providing predetermined current distribution among said electrodes, comprising:

a. a transformer having first and second windings, said first winding having first and second ends, and said second winding having means for a connection to a load;

b. said first winding having a third plurality of taps intermediate said first and second ends thereof;

c. a switch connected between each of at least all but one said electrode and one of said taps and first and second ends of said first winding, said one said electrode connected directly to one of said taps and said first and second ends of said first winding, all said switches configured to operate in unison; and d. an RC filter of predetermined size connected across each said switch.

10. The circuit as recited in claim 9 wherein said electrodes are at different respective electrical potentials, and one of said first and second ends of said first winding is connected to one of said electrodes at greatest positive and negative potentials, and the other of said first and second ends of said first winding is connected through a said switch to the other of said electrodes at greatest positive and negative potentials.

11. The circuit as recited in claim 9 wherein said taps are adjustable.

12. The circuit as recited in claim 10 wherein said first winding has a center tap for connection to one of said electrodes at greatest positive and negative potentials.

13. An inverter circuit for a power source delivering output current through a first plurality of positive electrodes and second plurality of negative electrodes, said circuit providing predetermined current distribution among said electrodes, comprising:

a. a transformer having first and second windings, said first winding having first and second ends, and said second winding having means for connection to a load;

b. said first winding having a third plurality of taps intermediate said first and second ends thereof;

c. a silicon controlled rectifier switch connected between each of at least all but one said electrode and one of said taps and first and second ends of said first winding, said one said electrode connected directly to one of said taps and said first and second ends of said first winding, all said switches configured to operate in unison; and d. a commutating circuit of predetermined size connected across each said rectifier switch.

14. The circuit as recited in claim 13 wherein said electrodes are at different respective electrical potentials, and one of said first and second ends of said first winding is connected to one of said electrodes at greatest positive and negative potentials, and the other of said first and second ends of said first winding is connected through a said rectifier switch to the other of said electrodes at greatest positive and negative potentials.

15. The circuit as recited in claim 13 wherein said taps are adjustable.

16. The circuit as recited in claim 14 wherein said first winding has a center tap for connection to one of said electrodes at greatest positive and negative potentials.

17. A buck-boost type circuit for a power source delivering output current through a first plurality of positive electrodes and second plurality of negative electrodes, said circuit providing predetermined current distribution among said electrodes, comprising:

a. a transformer having first and second windings, said first winding have first and second ends, and said second winding having means for connection to a load;

b. said first winding having a third plurality of taps intermediate said first and second ends thereof;

c. a transistor switch connected between each respective said electrode and one of said taps and first and second ends of said first winding, all said switches configured to switch in unison; and d. a capacitor of predetermined size connected between each said electrode and a common juncture.

18. The circuit as recited in claim 17 wherein said taps are adjustable.

19. The circuit as recited in claim 17 wherein said electrodes are at different respective electrical potentials, and said second end of said first winding is connected through a said switch to said electrode at greatest positive potential and through a said switch to said electrode at greatest negative potential.

20. A circuit for a power source delivering output current through a first plurality of positive electrodes and second plurality of negative electrodes, said circuit providing predetermined current distribution among said electrodes, comprising:

a. a transformer having first and second windings, said first winding having first and second ends, and said second winding having means for connection to a load;

b. said first winding having a third plurality of taps intermediate said first and second ends thereof;

c. a capacitor of predetermined size having first and second ends and connected to said first end thereof to said first end of said first winding;

d. a first plurality of first rectifiers connected respectively between said positive electrodes and said taps and second end of said first winding, and a second plurality of second rectifiers connected respectively between said negative electrodes and said taps and second end of said first winding;

e. a second rectifier and an inductance of predetermined size connected in series relationship between each respective positive electrode and said second end of said capacitor, and a first rectifier and an inductance of predetermined size connected in series relationship between each respective negative electrode and said second end of said capacitor; and f. wherein said first rectifiers are configured to conduct alternately with said second rectifiers.

21. The circuit as recited in claim 20 wherein said electrodes are at different respective electrical potentials, and said second end of said first winding is connected through a said first rectifier to said electrode at greatest positive potential and through a said second rectifier to said electrode at greatest negative potential.

22. The circuit as recited in claim 21 wherein said taps are adjustable.

23. In a magnetohydrodynamic generator having a plurality of electrode pairs for delivering output current therefrom, a current distribution circuit for said generator providing predetermined current distribution among said electrode pairs, comprising:

a. a pair of capacitors of respective predetermined sizes connected in series circuit relationship and first and second controlled rectifiers connected in series circuit relationship from each positive to each negative electrode of each electrode pair, each pair of said rectifiers connected in parallel relationship to each corresponding capacitor pair, said first rectifiers configured to conduct alternately with said second rectifiers;

b. inductor means having first and second ends and connected at said first end thereof to the juncture of each said capacitor pair;

c. a transformer having first and second windings, said first winding having first and second ends and connected at said first end thereof to the juncture of one said first and second rectifier pair, and at said second end thereof to said second end of said inductor means;

d. said first winding having a plurality of taps intermediate said first and second ends thereof, each of said taps connected to the juncture of one of the remainder of said rectifier pairs; and e. said second winding having means for connection to a load.

24. The generator as recited in claim 23 wherein said first winding has a number of taps equal to one less than the number of electrode pairs on said power source.

25. The generator as recited in claim 24 wherein said taps are adjustable.

26. The generator as recited in claim 23 wherein the values of said capacitors and said inductor means are selected to maintain the Q value of said circuit at two or more.

27. In a magnetohydrodynamic generator having a first plurality of positive electrodes and second plurality of negative electrodes for delivering output current therefrom, a current distribution circuit for said generator providing predetermined current distribution among said electrodes, comprising:

a. a transformer having first and second windings, said first winding having first and second ends, and said second winding having means for connection to a load;

b. said first winding having a third plurality of taps intermediate said first and second ends thereof;

c. inductor means having first and second ends and connected at said first end thereof to said first end of said first winding;

d. a capacitor of preselected capacitance connected between each said electrode and said second end of said inductor means; and e. a first plurality of rectifiers connected, respectively, between each said positive electrode and one of said taps and second end of said first winding, and a second plurality of rectifiers connected, respectively, between each said negative electrode and one of said taps and second end of said first winding, said first plurality of rectifiers configured to conduct alternately with said second plurality of rectifiers.

28. The generator as recited in claim 27 wherein said electrodes are at different respective electrical potentials, and said second end of said first winding is connected through one of said first plurality of rectifiers to said electrode at greatest positive potential and through one of said second plurality of rectifiers to said electrode at greatest negative potential.

29. The generator as recited in claim 28 wherein said taps are adjustable.

30. The generator as recited in claim 27 wherein the values of said capacitors and said inductor means are selected to maintain the Q value of said circuit at two or more.

31. In a magnetohydrodynamic generator having a first plurality of positive electrodes and second plurality of negative electrodes for delivering output current therefrom, a current distribution circuit for said generator providing predetermined current distribution among said electrodes, comprising:

a. a transformer having first and second windings, said first winding having first and second ends, and said second winding having means for a connection to a load;

b. said first winding having a third plurality of taps intermediate said first and second ends thereof;

c. a switch connected between each of at least all but one said electrode and one of said taps and first and second ends of said first winding, said one said electrode connected directly to one of said taps and said first and second ends of said first winding, all said switches configured to operate in unison; and d. an RC filter of predetermined size connected across each said switch.

32. The generator as recited in claim 31 wherein said electrodes are at different respective electrical potentials, and one of said first and second ends of said first winding is connected to one of said electrodes at greatest positive and negative potentials, and the other of said first and second ends of said first winding is connected through a said switch to the other of said electrodes at greatest positive and negative potentials.

33. The generator as recited in claim 31 wherein said taps are adjustable.

34. The generator as recited in claim 32 wherein said first winding has a center tap for connection to one of said electrodes at greatest positive and negative potentials.

35. In a magnetohydrodynamic generator having a first plurality of positive electrodes and second plurality of negative electrodes for delivering output current therefrom, a current distribution circuit for said generator providing predetermined current distribution among said electrodes, comprising:

a. a transformer having first and second windings, said first winding having first and second ends, and said second winding having means for connection to a load;

b. said first winding having a third plurality of taps intermediate said first and second ends thereof;

c. a silicon controlled rectifier switch connected between each of at least all but one said electrode and one of said taps and first and second ends of said first winding, said one said electrode connected directly to one of said taps and said first and second ends of said first winding, all said switches configured to operate in unison; and d. a commutating circuit of predetermined size connected across each said rectifier switch.

36. The generator as recited in claim 35 wherein said electrodes are at different respective electrical potentials, and one of said first and second ends of said first winding is connected to one of said electrodes at greatest positive and negative potentials, and the other of said first and second ends of said first winding is connected through a said rectifier switch to the other of said electrodes at greatest positive and negative potentials.

37. The generator as recited in claim 35 wherein said taps are adjustable.

38. The generator as recited in claim 36 wherein said first winding has a center tap for connection to one of said electrodes at greatest positive and negative potentials.

39. In a magnetohydrodynamic generator having a first plurality of positive electrodes and second plurality of negative electrodes for delivering output current therefrom, a current distribution circuit for said generator providing predetermined current distribution among said electrodes, comprising:
 a. a transformer having first and second windings, said first winding have first and second ends, and said second winding having means for connection to a load;
 b. said first winding having a third plurality of taps intermediate said first and second ends thereof;
 c. a transistor switch connected between each respective said electrode and one of said taps and first and second ends of said first winding, all said switches configured to switch in unison; and
 d. a capacitor of predetermined size connected between each said electrode and a common juncture.

40. The generator as recited in claim 39 wherein said taps are adjustable.

41. The generator as recited in claim 39 wherein said electrodes are at different respective electrical potentials, and said second end of said first winding is connected through a said switch to said electrode at greatest positive potential and through a said switch to said electrode at greatest negative potential.

42. In a magnetohydrodynamic generator having a first plurality of positive electrodes and second plurality of negative electrodes for delivering output current therefrom, a current distribution circuit for said generator providing predetermined current distribution among said electrodes, comprising:
 a. a transformer having first and second windings, said first winding having first and second ends, and said second winding having means for connection to a load;
 b. said first winding having a third plurality of taps intermediate said first and second ends thereof;
 c. a capacitor of predetermined size having first and second ends and connected at said first end thereof to said first end of said first winding;
 d. a first plurality of first rectifiers connected respectively between said positive electrodes and said taps and second end of said first winding, and a second plurality of second rectifiers connected respectively between said negative electrodes and said taps and second end of said first winding;
 e. a second rectifier and an inductance of predetermined size connected in series relationship between each respective positive electrode and said second end of said capacitor, and a first rectifier and an inductance of predetermined size connected in series relationship between each respective negative electrode and said second end of said capacitor; and
 f. wherein said first rectifiers are configured to conduct alternately with said second rectifiers.

43. The generator as recited in claim 42 wherein said electrodes are at different respective electrical potentials, and said second end of said first winding is connected through a said first rectifier to said electrode at greatest positive potential and through a said second rectifier to said electrode at greatest negative potential.

44. The generator as recited in claim 43 wherein said taps are adjustable.

* * * * *